United States Patent Office 3,493,528
Patented Feb. 3, 1970

3,493,528
PROCESS FOR SINGLE STAGE ADDITION OF RESIN IN THE PREPARATION OF MULTI-LAYER BAGASSE BOARDS
John F. Rakszawski, Somerset, and Herbert F. Schroeder, South Plainfield, N.J., assignors to Esso Research and Engineering Company, a corporation of Delaware
No Drawing. Filed Oct. 23, 1967, Ser. No. 677,052
Int. Cl. B32b 9/00; C08b 23/00
U.S. Cl. 260—17.2
6 Claims

ABSTRACT OF THE DISCLOSURE

The manufacture of pith-coated fiber boards from milled bagasse requires different concentrations of resin in the bagasse ipth and fibers. The required concentrations can be controlled and provided in a single stage application by controlling the resin viscosity and the proportion of pith present.

Background of the invention

This invention relates to the manufacture of fiber boards and hard boards from milled bagasse. More particularly, it relates to an improved method for controlling the distribution of resin used in the formulations of such boards.

It is known to make fiber boards and hard boards or particle boards from milled bagasse, a by-product of sugar manufacture the crushed residue of sugar cane stalk. Bagasse consists principally of fibrous components. The fibrous components include the rind fiber and the fibro-vascular fiber bundles or cells from which the juice has been extracted. The fibrous components, especially the fibro-vascular fiber bundles or shives, are united or bonded together with the pith, though some of the pith is found in the bagasse in loose powder form.

The pith is a nonorganized, nonfibrous, pulpy substance. Its chemical nature, light cellular structure and high surface area, relative to its mass, make it a highly reactive and absorbent material of limited commercial utility. It is, in fact, most often a waste product.

In prior art processes, the pith is separated via chemical or mechanical means from the fibrous materials as completely as possible, and then discarded. This has been considered necessary to provide a raw material suitable for the formation of structural boards or finished products of optimum structure and quality—viz. optimum for machine operation, product quality and low chemical cost per ton of pulp produced. In the separation, large quantities of the fibro-vascular fiber are also unavoidably removed along with the pith, and generally discarded therewith. This represents additional waste and, though bagasse is variable in composition, the waste can range above about 50 percent based on the initial weight of the bagasse.

Fiber boards and particle boards made of milled bagasse have been prepared with greatly improved surface characteristics by a new process in which green bagasse is first milled to break up the fibers into smaller fibers and particles of conventional size ranges.

A conventional board resin, preferably a thermosetting resin such as phenol-formaldehyde, is then added to and mixed with the milled fibers and pith particles. After the resin is added, the milled bagasse is classified into a coarse fiber fraction and a pith-and-fines fraction. Additional resin is then added to the pith-and-fines fraction or the fiber fraction, or both. A mat is then prepared by conventional means such as air felting. The mat is composed of layers in which pith and fines are present on the surfaces; the coarse fibrous fraction constitutes the center of the mat. After the mat is prepared, it is pressed in a conventional press at temperatures and pressures sufficient to cure the resin thus forming a rigid structure. The resulting fiber board or particle board has outstanding surface characteristics, e.g., strength, hardness, density, printability, appearance, etc., because of the presence of the pith-and-fines fraction.

Since the pith-and-fines fraction on the surface of bagasse boards requires different amounts of resin than does the fibrous fraction, it has been considered essential to adjust the resin contents of the two fractions after they are separated from each other. Thus it has been necessary to provide two complete resin addition facilities along with extra milling or mixing equipment in order to provide optimum resin contents on the various fractions of the constituents for satisfactory bagasse boards.

Summary of the invention

It is an object of this invention to provide an improved method of preparing bagasse for use in the manufacture of fiber boards and particle boards. A more specific object of the invention is to provide an improved method of controlling the resin distribution between the fibrous fraction and the pith-and-fines fraction of milled bagasse in a single stage resin application. A particular objective is to provide a method for applying a resin simultaneously to a pith-and-fines fraction and a fibrous fraction in a mixture and yet obtaining different concentrations of resin on the two fractions, each concentration being within the range desired for manufacture of a final board product.

This invention contemplates a method for simultaneously providing resin on both the pith-and-fines fraction and the fibrous fraction of milled bagasse and controlling the resin distribution between the fractions by controlling the total concentration of pith.

The invention involves providing a mixture of the milled bagasse constituents, determining the relative portions of pith, fines and fibers, and adjusting the composition of the mixture to obtain a resin split between the various fractions in the desired portions. The term "resin split" as used herein means the ratio of the resin concentration in the pith-and-fines fraction to the resin concentration in the fiber fraction.

It has been found desirable to maintain the resin split ratios between about 1.8 and about 3.5, preferably should be about 2.0 to about 3.0. Thus it has been found desirable to maintain resin concentrations in the pith-and-fines fraction about two to three times as high as the concentration in the fiber fraction. To obtain preferred splits of resin the composition of the milled bagasse mixture should be maintained between about 15% and 30% pith-and-fines, preferably about 20% to about 25%, based on total weight of the pith-and-fines fraction and the fiber fraction.

The resin is added in an amount ranging at least about 6 wt. percent preferably about 7 to 15 wt. percent. In general the greater the pith and fines fraction the greater the total amount of resin is required. The total resin required is also affected by the resin viscosity. Wide ranges of viscosity can be used between about 10 and about 1000 centipoises measured in an aqueous solution 38% solids concentration. In general the lower the viscosity the greater will be the concentration of resin on the fibrous fraction and the lower the concentration on the pith-and-fines fraction.

It is important to maintain the resin split ratios in the prescribed ranges. At too low resin splits the bagasse board product will have a surface which suffers from resin starvation, and at too high resin splits the interior fibrous fraction will likewise be starved of sufficient resin. In either case, the board product will often fail strength tests, e.g., surface hardness, bending strength, modulus of rupture, modulus of elasticity, etc. In general it is found that the greater ratios of resin split can be tolerated if high viscosity resins are used. For example, at viscosities of between about 10 and about 600 centipoises it is desirable to provide resin splits below about 2.5, while the resin viscosities of above about 600 to 1000 centipoises of acceptable resin splits can range as high as about 3.5.

Resin splits can be precisely controlled using a resin of given viscosity by adjusting the concentration of pith in the total milled bagasse mixture. The resin split ratio increases rapidly as the concentration of pith and fines increases. For most resins the optimum split is achieved on milled bagasse mixtures containing about 20 to 25% pith and fines and the split increases to above the maximum desirable ratio of about 3.5 when the pith and fines content of the mix is increased above about 30 wt. percent.

Preferred embodiments of the invention

Test samples are prepared in the following examples by mildly milling green bagasse and then separating substantially all of the pith from the fibers. The separated pith and fines is then added back to the fibers in an amount sufficient to provide the concentrations tabulated below. Phenol-formaldehyde resin in a 5% aqueous solution of sodium hydroxide is added at a solids content of 38% and having a viscosity of 100 centipoises. The resin is added to the various samples of pith, fibers, and fines in the portions indicated in the table and mixed and milled in a conventional disc mill, i.e., a Bauer mill. The pith and fines are then separated from the fibers by conventional air classification in a cyclone separator. The concentration of phenol-formaldehyde resin on each fraction is then measured and the results are as indicated in the table below.

| Pith concentration (wt. percent of total mixture) | Average resin concentration [1] (wt. percent) | Resin viscosity at 38% concentration in aqueous solution | Resin split ratio |
|---|---|---|---|
| 21 | 13.3 | 100 | 1.97 |
| 26 | 12.9 | 100 | 2.35 |
| 16 | 8.3 | 710 | 2.54 |
| 26 | 10.9 | 710 | 2.94 |
| 18 | 10.5 | 955 | 2.67 |
| 21 | 10.3 | 955 | 2.95 |
| 23 | 8.8 | 955 | 3.43 |

[1] Average resin concentration is based on total weight of pith, fines, and fibers.

Laminar structured bagasse boards are prepared by air felting a layer of pith and fines followed by a layer of fibers and then a top layer of pith and fines. The loose felted mats are pressed in a conventional board press at about 300° F. until the resin is cured. The boards have excellent high density surfaces as well as strongly bonded interiors.

In sharp contrast, it is found that at resin split ratios below about 1.8, the resulting board surfaces are inferior in quality and tend to be powdery and soft and cannot be provided with printed surfaces since any ink tends to be absorbed and diffuses through the surface. Conversely, when the resin split ratio is too high, it is found that the total resin content of the fibrous interior is too low to provide sufficient strength to the board product. This results in a board having low bending strength and low modulus of elasticity. When the resin splits result in resin starvation of either the surface or interior fractions, it is necessary to add excess resin to compensate for the deficiency.

Any conventional fiber board and particle board resin can be used in accordance with the present invention and the invention is not intended to be limited to any particular resin. It is preferred, however, to use thermosetting resins, especially phenol-formaldehyde or urea-formaldehyde resins. Similarly, conventional depithing, mixing, milling and pressing equipment can be used, and this invention is not intended to be limited to any particular type of equipment.

What is claimed is:

1. In a process for making multi-layer bagasse boards, the improvement comprising milling bagasse to form mixed pith-and-fines and fiber fractions, adjusting the pith-and-fines fraction to between about 15 and 30 wt. percent, based on total weight of pith-and-fines and fiber fractions, adding at least about 6 wt. percent of a resin to the mixed pith-and-fines and fiber fractions, separating said pith-and-fines and fiber fractions and forming them into a laminar structured board having at least a fibrous layer and a pith-and-fines layer and curing said resin to provide structural rigidity, whereby the ratio of resin concentration in the pith-and-fines fraction to the resin concentration in the fiber fraction ranges from about 1.8 to about 3.5.

2. The process of claim 1 wherein said pith-and-fines fraction ranges from about 20 to about 25 wt. percent, based on total weight of pith-and-fines and fiber fractions.

3. The process of claim 1 wherein said resin is added in an amount ranging from about 7 to about 15 wt. percent.

4. The process of claim 3 wherein the resin viscosity ranges from about 10 to about 1000 centipoises, measured in aqueous solution at 38% solids concentration.

5. The process of claim 3 wherein said resin viscosity ranges from about 10 to about 600 centipoises and said pith-and-fines fraction is adjusted to provide said ratios of resin concentrations below about 2.5.

6. The process of claim 3 wherein said resin viscosity ranges above about 600 to about 1000 centipoises and said pith-and-fines fraction is adjusted to provide said ratios of resin concentrations below about 3.5.

References Cited

UNITED STATES PATENTS

| 2,044,213 | 6/1936 | Irvine | 106—163 |
| 2,402,554 | 6/1946 | Irvine et al. | 106—163 |
| 2,754,728 | 7/1956 | Runckel et al. | 264—112 |

FOREIGN PATENTS

| 985,631 | 3/1965 | Great Britain. |

OTHER REFERENCES

J. Grant: Sugar Industry Abstracts, 1966, p. 190, No. 783.

WILLIAM H. SHORT, Primary Examiner

E. WOODBERRY, Assistant Examiner

U.S. Cl. X.R.

260—17.3; 264—112, 113, 122